(12) United States Patent
Parrish et al.

(10) Patent No.: US 8,967,570 B2
(45) Date of Patent: Mar. 3, 2015

(54) BLIND RETENTION MOUNT

(75) Inventors: Russell P. Parrish, Glastonbury, CT (US); Thomas M. Barry, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 321 days.

(21) Appl. No.: 13/285,348

(22) Filed: Oct. 31, 2011

(65) Prior Publication Data

US 2013/0105652 A1    May 2, 2013

(51) Int. Cl.
*A47F 5/00* (2006.01)
*F01D 25/24* (2006.01)
*F02K 1/80* (2006.01)

(52) U.S. Cl.
CPC .............. *F01D 25/243* (2013.01); *F02K 1/80* (2013.01)
USPC ........ 248/298.1; 248/554; 248/557; 248/694; 29/428

(58) Field of Classification Search
CPC ......... F16M 13/00; B23P 11/00; B23P 17/04; A16M 5/31
USPC .............. 248/298.1, 554, 556, 557, 694, 685, 248/682; 24/428; 604/89, 218
See application file for complete search history.

(56) References Cited

U.S. PATENT DOCUMENTS

| | | | | |
|---|---|---|---|---|
| 2,790,437 A * | 4/1957 | Moore | ........................... | 600/564 |
| 3,605,069 A | 9/1971 | Dorrell | | |
| 4,156,554 A * | 5/1979 | Aujla | ........................... | 439/584 |
| 4,159,744 A * | 7/1979 | Monte et al. | .................... | 169/26 |
| 4,457,479 A * | 7/1984 | Daude | ........................... | 244/203 |
| 5,128,830 A | 7/1992 | Deluca et al. | | |
| 5,176,339 A * | 1/1993 | Schmidt | .......................... | 244/54 |
| 5,570,686 A * | 11/1996 | Century | ................... | 128/203.12 |
| 6,264,113 B1 * | 7/2001 | Dingler | ............................. | 239/8 |
| 6,296,088 B1 * | 10/2001 | Carlson | ....................... | 188/267.2 |
| 6,342,872 B1 | 1/2002 | Potin et al. | | |
| 6,547,181 B1 * | 4/2003 | Hoisington et al. | ............ | 244/46 |
| 7,436,367 B2 | 10/2008 | Blickle | | |
| 7,451,955 B2 * | 11/2008 | Teramachi et al. | ....... | 248/223.41 |
| 7,811,133 B2 * | 10/2010 | Gray | ......................... | 439/607.41 |
| 8,136,766 B2 * | 3/2012 | Dennis | ........................ | 244/199.4 |
| 8,256,750 B2 * | 9/2012 | Cottrell et al. | ................ | 267/136 |
| 8,444,325 B2 * | 5/2013 | Guest | ............................... | 385/53 |
| 2001/0006209 A1 * | 7/2001 | Yoshida et al. | ............... | 248/429 |
| 2002/0178901 A1 * | 12/2002 | Bergstrom | ....................... | 89/198 |
| 2003/0122384 A1 * | 7/2003 | Swanson et al. | ........... | 292/307 R |
| 2003/0222191 A1 * | 12/2003 | Tsai | ........................... | 248/354.1 |
| 2005/0154347 A1 * | 7/2005 | Neracher | .......................... | 604/68 |
| 2005/0207866 A1 * | 9/2005 | Attanasio | ....................... | 411/353 |
| 2006/0229570 A1 * | 10/2006 | Lovell et al. | ................... | 604/218 |
| 2006/0233601 A1 * | 10/2006 | Crain et al. | ..................... | 403/300 |
| 2008/0029573 A1 * | 2/2008 | Shelton et al. | ............. | 227/175.2 |
| 2009/0229844 A1 * | 9/2009 | Pillers, II | ....................... | 173/128 |
| 2010/0094253 A1 * | 4/2010 | Boyd et al. | .................... | 604/506 |
| 2011/0033165 A1 * | 2/2011 | Guest | ............................. | 385/138 |
| 2011/0054414 A1 * | 3/2011 | Shang et al. | ................... | 604/218 |

(Continued)

*Primary Examiner* — Monica Millner
(74) *Attorney, Agent, or Firm* — Kinney & Lange, P.A.

(57) ABSTRACT

A mount assembly includes a main body, a bayonet, and a block. The bayonet is movable relative the main body to insert a portion of the bayonet into an internal cavity of the main body. The block is disposed within the internal cavity and is movable relative to the main body from a first position to a second position. In the first position, the bayonet is captured and held between the block and an inner wall of the internal cavity. In the second position, the block allows the bayonet to be removed from the internal cavity.

6 Claims, 2 Drawing Sheets

(56) References Cited

U.S. PATENT DOCUMENTS

| | | |
|---|---|---|
| 2011/0106015 A1* | 5/2011 | Liscio et al. .................. 604/187 |
| 2011/0108613 A1* | 5/2011 | Stribling et al. ........... 229/103.1 |
| 2011/0126395 A1* | 6/2011 | Nguyen et al. .................. 29/428 |
| 2011/0126665 A1* | 6/2011 | Khan et al. ...................... 74/560 |
| 2012/0136298 A1* | 5/2012 | Bendix et al. ................... 604/89 |
| 2012/0145860 A1* | 6/2012 | Ruffo et al. .................... 248/251 |
| 2012/0180290 A1* | 7/2012 | Blacklin ......................... 29/428 |
| 2012/0240760 A1* | 9/2012 | Pizano ....................... 89/191.01 |
| 2012/0284997 A1* | 11/2012 | Morin et al. ............... 29/525.01 |
| 2013/0068199 A1* | 3/2013 | Cerny et al. .................. 123/470 |
| 2013/0165868 A1* | 6/2013 | Isaacson et al. .............. 604/256 |
| 2013/0230308 A1* | 9/2013 | Moody et al. ................. 396/419 |

\* cited by examiner

BLIND RETENTION MOUNT

BACKGROUND

The invention relates to an assembly and a method, and more particularly, to a mounting method and a mount assembly that can be used to support a part such as a liner or panel where access to the mount assembly is not readily accessible.

Typically, mounting devices for parts such as liners and panels can be accessed at an underside location or along a perimeter of the part. Because the mounting device is accessible, a fastener or similar conventional linkage can be used to affix the mounting device to the part. In instances where the mounting device is not readily accessible, clearances must be built into the pieces of the mounting device to facilitate installation. These clearances are not reduced or eliminated after mounting is accomplished resulting in excessive wear to the pieces of the mounting device.

SUMMARY

A mount assembly includes a main body, a bayonet, and a block. The bayonet is movable relative the main body to insert a portion of the bayonet into an internal cavity of the main body. The block is disposed within the internal cavity and is movable relative to the main body from a first position to a second position. In the first position, the bayonet is captured and held between the block and an inner wall of the internal cavity. In the second position, the block allows the bayonet to be removed from the internal cavity.

A mount assembly configured to support a first part includes a main body, a bayonet, and a block. The bayonet is connected to the first part and is movable relative the main body to insert a portion of the bayonet into an internal cavity of the main body. The block is disposed within the internal cavity and is movable relative to the main body from a first position where the bayonet abuts both the block and an inner wall of the internal cavity and a second position where the block is disposed at a distance from the bayonet. The actuation member extends into the internal cavity of the main body and is connected to the block. The actuation member extends outward from the main body into the cavity of the first part and is remotely actuatable at a distance from the mount assembly.

A method of mounting a first part to a second part includes a bayonet, a main body, and a block. The bayonet is connected to the first part and disposed adjacent to the main body, which is connected to the second part. The bayonet is inserted into an internal cavity of the main body and the block is moved along a ramp within the internal cavity to abut the bayonet to capture and hold the bayonet between the block and an inner wall of the cavity.

DETAILED DESCRIPTION

Figure 1A:
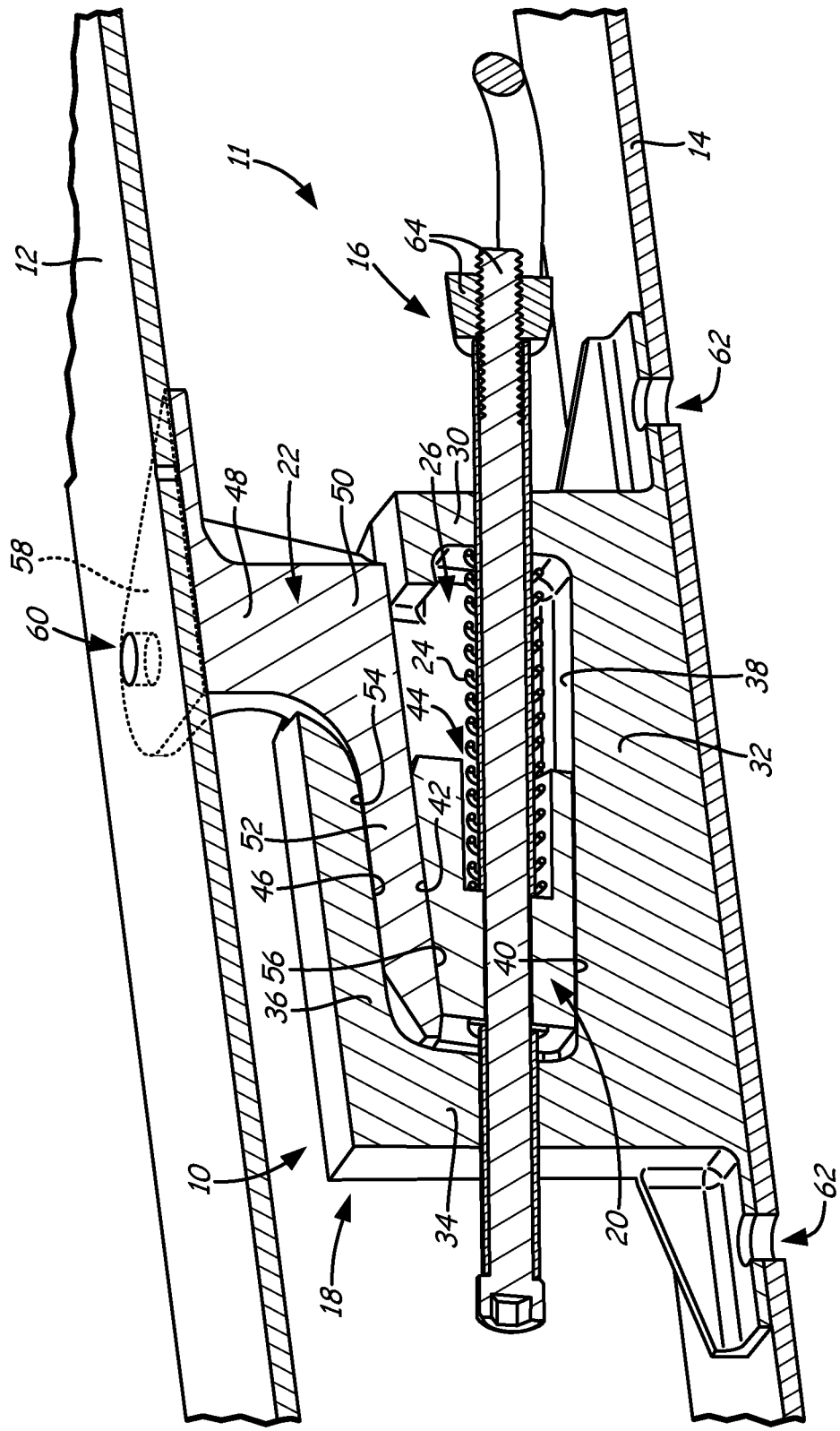
FIG. 1A shows a perspective view of a section of a mount assembly disposed in an installed position between a first part and a second part.
Figure 1B:
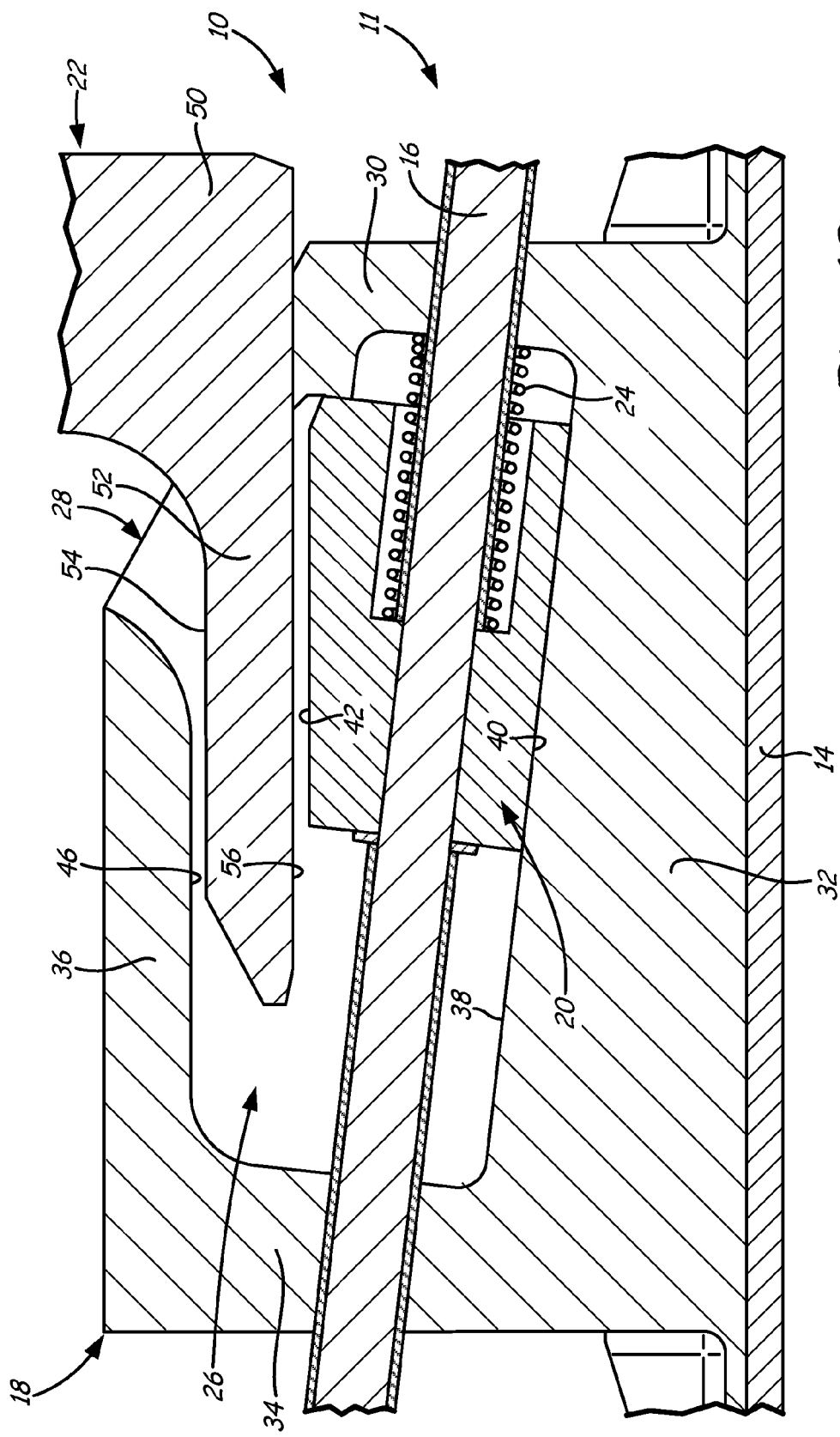
FIG. 1B shows an enlarged sectional view of the mount assembly of FIG. 1A in a retracted uninstalled position.

FIGS. 1A and 1B show a section of a mount assembly 10 disposed in an installed position in a cavity 11 between a first part 12 and a second part 14. Mount assembly 10 includes an actuation member 16, a main body 18, a block 20, a bayonet 22, and a bias element 24. Main body 18 includes a cavity 26, an entrance 28, a first wall 30, a second wall 32, a third wall 34, and a fourth wall 36. Second wall 32 includes a ramp 38. Block 20 includes a first interface surface 40, a second interface surface 42, and a receptacle 44. Fourth wall 36 includes an interior surface 46. Bayonet 22 includes a main body 48, a heal 50, and a foot 52. Foot 52 includes a first interface surface 54, a second interface surface 56, and a mounting plate 58. First part 12 includes a hole 60. Second part 14 includes holes 62.

As previously discussed, many aircraft structures such as panels and liners must be mounted for structural support. Typically, mounts are secured using fasteners. Unfortunately in some situations, mounts used to support the panels and liners can be difficult to access from external to the liners and panels for assembly and disassembly purposes. In such situations it may not be feasible to use fasteners and other mounting methods such as utilizing interconnecting parts with built-in clearances are employed. However, as this approach does not eliminate the clearances between the interconnecting parts, excessive wear of the mount can occur especially in a high vibration environment. As will be discussed subsequently, the mount assembly 10 disclosed herein allows clearances between the components of mount assembly 10 to be reduced or eliminated even in the instance where mount assembly 10 is not readily accessible. This reduces the likelihood of wear. Additionally, mount assembly 10 can be actuated remotely to create or reduce clearances to accomplish assembly or begin disassembly of mount 10 and liner/panel. Mount assembly 10 can be actuated remotely by extending actuation member 16 from mount 10 to an accessible location such as a location external to the liner/panel. Once clearances between components of mount 10 are accomplished by actuation, disassembly of mount assembly 10 and panels/liners can be accomplished by moving one panel relative to another.

As shown in FIG. 1A, mount assembly 10 is disposed in cavity 11 between first part 12 and second part 14. In the embodiment shown, first part 12 and second part 14 are spaced apart from on another and can comprise panels or liners that are supported by mount assembly 10. In other embodiments, mount assembly 10 can be attached to portions of a single part rather than two or more parts. In the embodiment shown in FIG. 1A, mount assembly 10 is not readily accessible within cavity 11 and indeed is actuateable only remotely via actuation member 16.

Actuation member 16 extends through and is movable relative to main body 18. As illustrated in the installed position in FIG. 1A, main body 18 and bayonet 22 abut one another in firm engagement and bayonet 22 and block 20 abut one another in firm engagement. Bayonet 22 is connected to and extends from first part 12 into main body 18.

Block 20 is movably disposed within main body 18 and is affixed to actuation member 16. Block 20 can be positioned to abut a lower portion of bayonet 22 by actuation member 16 and by bias element 24, which is also disposed within main body 18 about actuation member 16 in the embodiment shown.

In the embodiment shown, bias element 24 comprises a compression spring that operates to force block 20 into engagement with bayonet 22. Bias element 24 applies a load to keep block 20 in engagement with bayonet 22 when mount assembly 10 is in the installed position of FIG. 1A. As will be discussed subsequently, the load of bias element 24 is overcome by actuation member 16 to move block 20 to the uninstalled position of FIG. 1B. In other embodiments, bias element 24 can additionally or alternatively include a jack screw 64 or other means known in the art for applying a load that keeps block 20 engaged with bayonet 22.

As illustrated in FIG. 1A, main body 18 is affixed to second part 14, and is thus stationary relative to first part 12, bayonet 22, and actuation member 16. As will be discussed subsequently, in the embodiment shown, first part 12 and bayonet 22 are moved relative to main body 18 and second part 14 to provide access to cavity 11 (in the instance, for example, of a repair or installation) or to insert bayonet 22 into main body 18 to begin accomplishing the mounting of parts 12 and 14.

After bayonet 22 is inserted as shown in FIG. 1B, bayonet 22 is inserted further into cavity 26, and block 20 is advanced up ramp 38 within cavity 26 to bring main body 18, bayonet 22 and block 20 into firm abutting engagement with one another in the installed position of FIG. 1A. Thus, block 20 moves up ramp 38 to capture and hold bayonet 22 between block 20 and an inner wall (interior surface 46) of cavity 26. In one embodiment, movement of block 20 up ramp 38 can be accomplished by actuation member 16. In another embodiment, movement of block 20 up ramp 38 can be accomplished by bias element 24. In yet a third embodiment, movement of block up ramp 38 can be accomplished by both bias element 24 and actuation member 16. In other embodiments, second part 14 and main body 18 can be moved relative to first part 12 and bayonet 22 to provide access to cavity 11 and to insert bayonet 22 into main body 18 to achieve the installed position.

As shown in FIGS. 1A and 1B, main body 18 has an internal cavity 26 with entrance 28 disposed to interface and receive bayonet 22. In the embodiment shown, cavity 26 is surrounded and formed by first wall 30, second wall 32, third wall 34, and fourth wall 36. Cavity 26 receives bayonet 22 via entrance 28, which is disposed between first wall 30 and fourth wall 36. First wall 30 is designed with a clearance from bayonet 22. Similarly, fourth wall 36 initially has a clearance from bayonet 22. Together these clearances allow bayonet 22 to extend through entrance 28 into cavity 26 without interference.

First wall 30 is disposed adjacent to bayonet 22 and extends away therefrom. First wall 30 is adapted to receive actuation member 16, which extends therethrough into cavity 26. In the embodiment shown, first wall 30 is also contacted by bias element 24, a first end of a compression spring. First wall 30 transitions to second wall 32. Second wall 32 interfaces with second part 14 and is provided with ramp 38. Ramp 38 reduces the size of cavity 26 traveling distally away from bayonet 22 toward third wall 34.

First interface surface 40 of block 20 interfaces and is slidably disposed on ramp 38. Block 20 has a wedge shape and is movable along ramp 38 from the installed position of FIG. 1A, to the uninstalled retracted position of FIG. 1B. Second interface surface 42 of block 20 interfaces with bayonet 22 and extends generally parallel thereto. Receptacle 44 is disposed between first interface surface 40 and second interface surface 42 and is adapted to receive actuation member 16 and bias element 24.

In the embodiment shown in FIGS. 1A and 1B, ramp 38 (and thus first interface surface 40 of block 20) is sloped by an angle of about 6° relative to second interface surface 42 of block 20. In other embodiments, ramp 38 can be sloped relative to second interface surface 42 by a varying angular amount. The angle of slope ramp 38 will depend on various factors including the materials selected for main body 18 and block 20, desired tolerances, desired distance of travel of block 20, and the amount of load applied to block 20 by bias element 24.

In the embodiment shown, fourth wall 36 extends from third wall 34 toward bayonet 22 and entrance 28. Fourth wall 36 is disposed at a distance from first part 12. Interior surface 46 of fourth wall 36 extends along cavity 26 to interface with bayonet 22. When mount assembly 10 is in the uninstalled position shown in FIG. 1B, fourth wall 36 has a clearance from bayonet 22. When mount assembly 10 is in the installed position shown in FIG. 1A, fourth wall 36 is firmly abutted by and engaged with bayonet 22.

Main body 48 of bayonet 22 is adapted to interface with an underside of first part 12 and be affixed thereto. The means for affixing main body 48 to first part 12 can vary from embodiment to embodiment and can include any means know in the art such as fasteners and high temperature adhesives. Main body 48 extends away from first part 12 to heel 50. As previously discussed, heel 50 is disposed with clearance from first wall 30. Heel 50 transitions distally to foot 52. Foot 52 is adapted with a thickness to extend into cavity 26 with clearance from block 20 and fourth wall 36 when mount 10 is in the uninstalled position shown in FIG. 1B. Thus, first interface surface 54 of foot 52 has a clearance from interior surface 46 of fourth wall 36 in the uninstalled position of FIG. 1B. In the installed position of FIG. 1A, interior surface 46 firmly abuts and is engaged by first interface surface 54. Similarly, in the installed position of FIG. 1A with block 20 moved up ramp 38, second interface surface 56 abuts and is engaged by second interface surface 42 of block 20. In the un-installed position of FIG. 1B, block 20 is actuated down ramp 38 (against the resistance of bias element 24) leaving a clearance between second interface surface 42 and second interface surface 56.

In FIG. 1A, first part 12 interfaces with mounting plate 58 of bayonet 22. First part 12 and mounting plate 58 form hole 60. Hole 60 extends through first part 12 and into mounting plate 58 of bayonet 22. Hole 60 is adapted to receive a fastener (not shown) therein to affix bayonet 22 to first part 12. Similarly, holes 62 extend through second part 14 and portions of main body 18. Holes 62 are adapted to receive various types of fasteners to affix main body 18 to second part 12.

In the embodiment shown in FIGS. 1A and 1B, main body 18 is affixed to second part 14, and is thus stationary relative to first part 12, bayonet 22, and actuation member 16. First part 12 and bayonet 22 are moved relative to main body 18 and second part 14 to provide access to cavity 11 (in the instance, for example, of an installation or repair) or to insert bayonet 22 into main body 18 to begin to accomplish mounting of parts 12 and 14.

After bayonet 22 is inserted as shown in FIG. 1B, bayonet 22 is inserted further into cavity 26, and block 20 is actuated by actuation member 16 (and/or bias element 24) to bring main body 18, bayonet 22 and block 20 into firm abutting engagement with one another in the installed position of FIG. 1A. Bias element 24 applies a load to keep block 20 in engagement with bayonet 22 when mount 10 is in the installed position of FIG. 1A. To disassemble mount assembly 10, the load of bias element 24 is overcome by actuation member 16 to move block 20 down ramp 38 to the uninstalled position of FIG. 1B. Bayonet 22 (along with first part 12) can then be moved to the position shown in FIG. 1B with bayonet 22 partially retracted from cavity 26. To access cavity 11, bayonet 22 and first part 12 are moved away from main body 18 until bayonet 22 clears and is removed from main body 18. Once bayonet 22 is retracted, bayonet 22 and first part 12 can be removed allowing access to cavity 11.

Mount assembly 10 as described allows clearances between the components of mount assembly 10 such as bayonet 22, main body 18, and block 20 to be reduced or eliminated even in the instance where mount assembly 10 is not readily accessible and must be remotely actuated. By reducing or eliminating clearances, reduced wear results to the components of mount assembly 10. Additionally, mount assembly 10 allows cavity 11, which might otherwise be difficult to access conventionally, to become more readily accessible.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of mounting a first part to a second part, the method comprising:
   disposing a bayonet connected to the first part adjacent to a main body connected to the second part;
   inserting the bayonet into an internal cavity of the main body, wherein a block is disposed at a distance from the bayonet upon insertion of the bayonet into the internal cavity of the main body; and
   moving the block along a ramp within the internal cavity to abut the bayonet to capture and hold the bayonet between the block and an inner wall of the cavity.

2. The method of claim 1, further comprising providing a bias element that exerts a load on the block to urge the block to capture the bayonet.

3. The method of claim 2, wherein the block is moved along the ramp with a load applied by the bias element and an actuation member.

4. The method of claim 1, further comprising providing an actuation member that exerts a load on the block to move the block along the ramp.

5. A method of mounting a first part to a second part, the method comprising:
   disposing a bayonet connected to the first part adjacent to a main body connected to the second part;
   inserting the bayonet into an internal cavity of the main body;
   moving a block along a ramp within the internal cavity to abut the bayonet to capture and hold the bayonet between the block and an inner wall of the cavity; and
   providing a bias element that exerts a load on the block to urge the block to capture the bayonet.

6. A method of mounting a first part to a second part, the method comprising:
   disposing a bayonet connected to the first part adjacent to a main body connected to the second part;
   inserting the bayonet into an internal cavity of the main body;
   moving a block along a ramp within the internal cavity to abut the bayonet to capture and hold the bayonet between the block and an inner wall of the cavity; and
   providing an actuation member that exerts a load on the block to move the block along the ramp.

\* \* \* \* \*